US010999638B2

(12) United States Patent
Tagra et al.

(10) Patent No.: US 10,999,638 B2
(45) Date of Patent: May 4, 2021

(54) CONTENT-BASED NAVIGATION FOR RECORDINGS

(71) Applicant: Adobe Inc., San Jose, CA (US)

(72) Inventors: Sanjeev Tagra, Panipat (IN); Sachin Soni, New Delhi (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 171 days.

(21) Appl. No.: 16/250,599

(22) Filed: Jan. 17, 2019

(65) Prior Publication Data

US 2020/0236438 A1 Jul. 23, 2020

(51) Int. Cl.
| | | |
|---|---|---|
| *H04N 21/472* | (2011.01) | |
| *H04N 21/845* | (2011.01) | |
| *H04N 21/43* | (2011.01) | |
| *H04N 21/262* | (2011.01) | |
| *G06F 3/0485* | (2013.01) | |
| *H04N 21/6587* | (2011.01) | |

(52) U.S. Cl.
CPC ... *H04N 21/47217* (2013.01); *G06F 3/04855* (2013.01); *H04N 21/26233* (2013.01); *H04N 21/4307* (2013.01); *H04N 21/6587* (2013.01); *H04N 21/8456* (2013.01)

(58) Field of Classification Search
CPC ................................. H04N 21/47217
USPC ....................................... 386/230
See application file for complete search history.

(56) References Cited

U.S. PATENT DOCUMENTS

| | | | | |
|---|---|---|---|---|
| 2007/0168413 A1* | 7/2007 | Barletta | .............. | G06F 3/04883 709/203 |
| 2012/0047437 A1* | 2/2012 | Chan | ................ | H04N 21/47217 715/720 |
| 2013/0211966 A1* | 8/2013 | Clark | ..................... | G06Q 10/06 705/26.81 |
| 2014/0101550 A1* | 4/2014 | Zises | .................... | G11B 27/105 715/721 |
| 2015/0052437 A1* | 2/2015 | Crawford | ........... | H04N 21/2543 715/720 |
| 2020/0007915 A1* | 1/2020 | Bender | .............. | H04N 21/4302 |

\* cited by examiner

*Primary Examiner* — Eileen M Adams
*Assistant Examiner* — Daniel T Tekle
(74) *Attorney, Agent, or Firm* — FIG. 1 Patents

(57) ABSTRACT

Navigating a video recording based on changes in views of the recording's visual content is described. A content-based navigation system receives a recording including visual content and audio content. The content-based navigation system then determines a content scale for navigating the recording relative to an overall number of new or updated views of visual content during playback of the recording. Given the content scale, the content-based navigation system generates a content navigation control that enables navigating the recording at a granularity defined by the overall number of new or updated views of the recording's visual content. Navigation via the content navigation control is thus independent of time between changes to views of the recording's visual content during playback. Input to the content navigation control causes output of a different view of the recording's visual content, and optionally causes output of audio content synchronized with the different view of visual content.

20 Claims, 11 Drawing Sheets

CONTENT-BASED NAVIGATION FOR RECORDINGS

BACKGROUND

With advances in computing technology, online education platforms are an increasingly preferred option over learning in traditional brick and mortar classrooms, which are limited in availability by both time and geographic location. Online education platforms deliver content to student users by recording live classes where a human instructor presents and explains content. Recorded classes may then be played back at students' personal computing devices, which facilitates learning at convenient times and locations while maintaining an experience of attending a class or seminar in real-time.

To provide this online learning experience, an instructor generally uses a computing device to present content that might otherwise be displayed on a chalkboard, projector screen, and the like, in a brick and mortar classroom. Content presented on the instructor's computing device generally moves in a vertical manner, such as from bottom to top of the computing device's screen, with previously presented content eventually moving out of view off the top edge of the screen. A video screen capturing the instructor is also recorded with the presented content, and this recording is hosted by an online education platform for subsequent viewing. When viewing these recorded classes, students can navigate the recording using a horizontal time scale, such as a scroll bar, to pause, play, rewind, and fast forward to various points in a class.

Conventional approaches for navigating these recorded classes, however, are limited to using the horizontal time scale. However, content displayed by the instructor's computing device and content actually being explained by the instructor are not always concurrent. For example, first and second blocks of content may be displayed on the instructor's screen during a five minute portion of a class, with the instructor spending one minute presenting the first block and four minutes presenting the second block. Although a student attempting to navigate to the beginning of a discussion concerning the second block may be able to quickly reach some point of the five minute portion where both first and second blocks are displayed, navigating precisely to the beginning of the presentation of the second block is a time intensive and error-prone process that often requires significant manual interaction with the horizontal time scale.

Accordingly, techniques used by conventional content playback systems are faced with numerous challenges that involve the inefficient use of computational resources. One such challenge is the limited ability to navigate playback of a recording using only a horizontal time control, which requires multiple inputs to navigate among different views of visual content and is prone to user-induced error. For example, in order to navigate to a certain view of visual content presented earlier in a recording, a user is required to guess as to when the certain view of visual content was presented during the recording, often resulting in multiple inputs to the horizontal time scale until the desired content is found. As a corollary, these multiple inputs each waste computational resources across a content delivery pipeline used to deliver the recording from a storage location such as an online educational platform to a viewing user's computing device. For example, in a scenario where content of a recording is streamed from a server to a client computing device, each input to the horizontal time scale may cause the client computing device to transmit a request for new information to the server and prompt the server to respond with the requested content, repeatedly, until the desired view of content is found. Thus, conventional approaches for navigating recordings of audio and video content lack the ability to navigate the recording based on visual content in a time-independent manner. As a result, conventional approaches for navigating recordings include user interfaces that are prone to user-error mistakes, require cumbersome inputs, and disrupt the flow of the recordings, while wasting computational and network resources across a digital content delivery pipeline.

SUMMARY

To overcome these problems, content-navigable recording generation is described. A content-based navigation system receives a video recording including visual content and audio content. The content-based navigation system then determines a time scale for navigating the recording relative to an overall playback duration of the recording. To do so, the content-based navigation system parses the recording into multiple time buckets, each spanning a common duration. Audio content and visual content that would be output during playback over the duration specified by each time bucket is allotted to the time bucket. Each time bucket is also associated with a timestamp indicating a beginning playback position of the time bucket's audio and visual content, relative to a playback duration of the recording. Additionally, the content-based navigation system parses the recording into multiple content buckets, where each content bucket represents a change in visual content relative to an adjacent content bucket. Each content bucket includes the new or updated view of visual content, along with audio content that is output during the display of the content bucket's new or updated view of visual content. Each content bucket is additionally associated with a timestamp indicating a beginning playback position of the content bucket's visual content, relative to the playback duration of the recording.

Information included in the various time buckets is compiled into a time scale for the recording, which is representative of an overall duration of the recording as divided into discrete units of time. Information included in the various content buckets is compiled into a content scale for the recording, which is representative of an overall number of changes to views of the recording's visual content during playback.

Given the time scale and the content scale, the content-based navigation system generates a time navigation control for navigating the recording relative to an overall playback duration of the recording and a content navigation control for navigating the recording relative to the overall number of changes to views of the recording's visual content. The time navigation control thus enables navigation of the recording relative to the recording's overall playback duration, at a granularity defined by the number of time buckets generated for the recording. Conversely, the content navigation control enables navigation of the recording relative to an overall number of changes to views of the recording's visual content, at a granularity defined by the number of content buckets generated for the recording. In response to receiving input at the time navigation control or the content navigation control, the content-based navigation system identifies visual content and/or audio content using information provided by the respective time or content scale and alters playback of the recording to output the identified visual content and/or audio content. In implementations where the content-based navigation system alters only a display of the recording's visual content without interrupting playback of the recording's audio content, a content playback system may display a visual indication that playback of audio content and visual content are not synchronized. The visual indication may further be selectable to resume synchronized output of the audio content and the visual content in a manner that does not interrupt an output of the audio content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
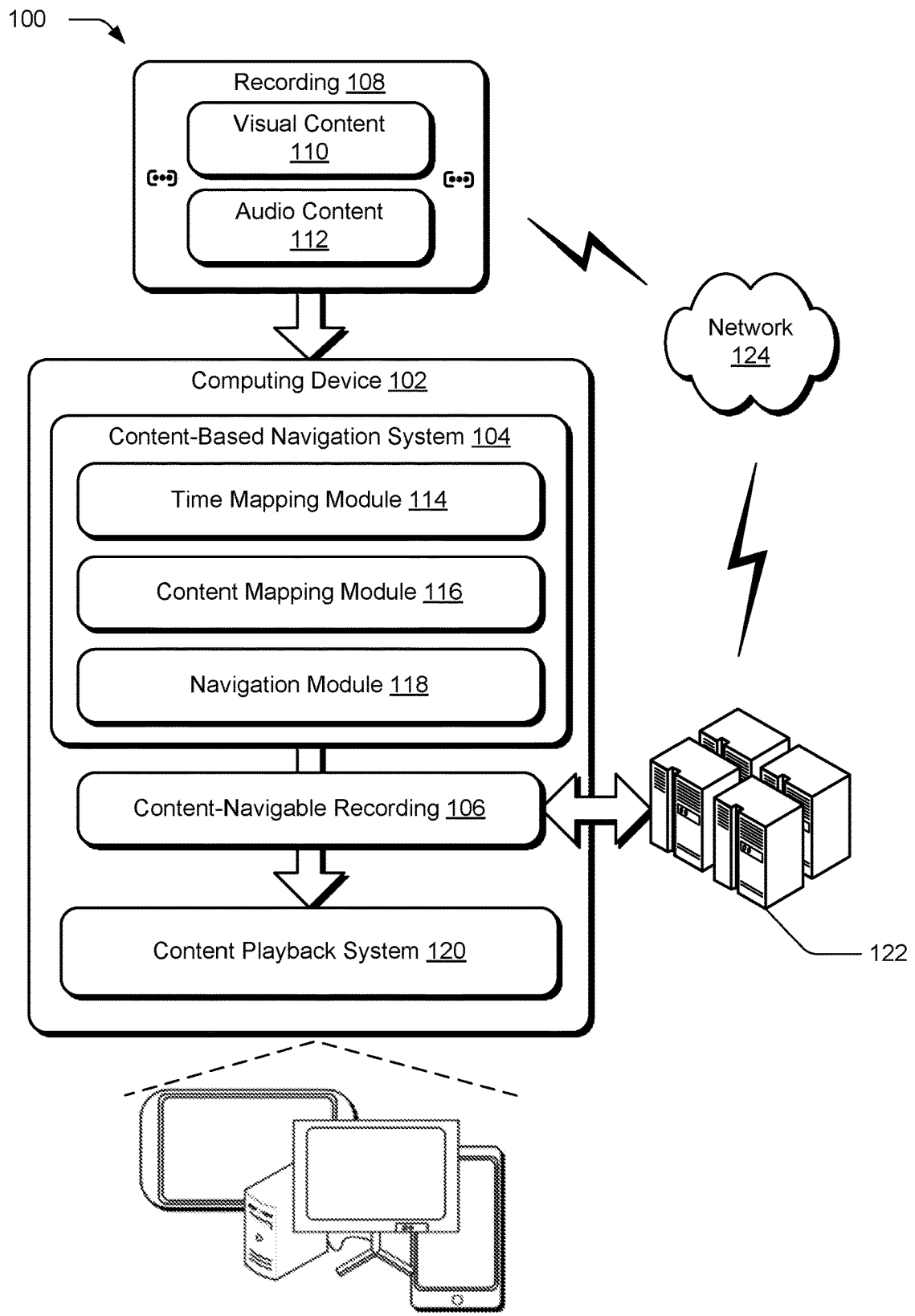
FIG. 1 is an illustration of an environment in an example implementation that is operable to employ content-based navigation of recordings using techniques described herein.

As a result of advances in computing technologies, computing systems are increasingly used as a platform for learning in place of traditional brick and mortar classrooms. These platforms enable educating users across different geographies, skill sets, genders, ages, and so forth, in a manner that is not constrained by locations or times that are otherwise restrictive in the conventional classroom setting.

For instance, a student user can access a recorded educational class via her personal computing device from the comfort of her own home at a time that fits her schedule by accessing the class via the internet. To instruct students using these computer-based educational platforms, a teacher generally records a live demonstration of himself while presenting content using his own computing device. Visual and audio content of the instructor's computing device is displayed in the recording for viewing by the student along with video of the instructor providing live demonstrations and hands-on examples while teaching. This enables the student to consume both audio and visual content of the class, as well as the instructor's non-verbal communications that would otherwise be experienced by attending the class in real-time.

Visual content presented by the instructor can be modeled as flowing in a vertical manner, such as from bottom to top of a display of the instructor's computing device, similar to a manner in which commands are executed on a console. For instance, in an example class where the instructor is explaining code progress and compilation on a display of his computing device, a first executed command is moved upward to clear space for displaying each subsequently executed command and compiled results, until the first command eventually moves out of view. To deliver class content, the entire class is recorded in the form of a video and hosted on a delivery platform for subsequent download and viewing by students.

Conventional approaches for consuming these recorded classes, however, are limited to traversing the class using a horizontal time scale, which enables a student to traverse the class's content by playing, pausing, forwarding, and rewinding synchronized playback of audio and visual content of the recording. However, such conventional approaches are limited in their ability to mimic the learning experience of attending the class in real-time via physical presence in the brick and mortar classroom. For example, in a conventional classroom setting, an instructor may use a chalkboard, a whiteboard, a projection screen, combinations thereof, and the like, to present content. In the conventional classroom, the size of the chalkboard, whiteboard, or projection screen is often large enough to display large amounts of content, such that a student can easily reference previously presented content by looking at a portion of the display, even if large amounts of content have been subsequently added or if a long duration of time has elapsed since the content was initially presented.

However, due to the smaller form factor of many computing devices used to consume recorded classes hosted by electronic educational platforms, students are often unable to reference previously presented content without interacting with a horizontal time scale. Specifically, this manual interaction requires rewinding a video to the desired point where content was displayed on the screen. This navigation problem is further compounded for computing devices having smaller form factors, such as wearable devices, personal cellphones, and so forth. Furthermore, these conventional approaches for navigating recorded classes are cumbersome and unintuitive, as a student is forced to guess when desired content was presented during the recording, often resulting in multiple inputs to the horizontal time scale until the desired content is found. A student wishing to resume the class is then forced to perform the same guess-and-check process to return to the previous point of the recording, which is time consuming and error-prone. Even if the student were to diligently track timestamps for each presented piece of information, the manual input required to navigate among the different timestamps is cumbersome and disruptive to the educational experience. Conventional systems for navigating recordings are thus prone to user-error mistakes, cumbersome, and disruptive to the flow of the recordings.

Accordingly, content-based recording navigation techniques and systems are described. In one example, a content-based navigation system receives a recording that includes visual content and audio content. The content-based navigation system employs a time mapping module that is configured to segment an overall playback of the recording into discrete time segments, also referred to herein as time buckets. Each time segment includes information describing the corresponding audio content and visual content of the recording output over the time segment during playback of the recording. These time segments and their corresponding information are used by the content-based navigation system to generate a time scale for the recording, which enables navigation of the recording relative to an overall playback of the recording at a granularity defined by an overall number of time segments generated for the recording. Using the time scale, a navigation module of the content-based navigation system is configured to generate a time navigation control for navigating the recording relative to its overall playback duration. In some implementations, the time scale and time navigation control are embedded by the content-based navigation system into metadata of the recording, such that upon consumption of the recording by a content playback system, the content playback system is provided with the requisite information to enable navigating the recording on the basis of time.

Additionally, the content-based navigation system employs a content mapping module that is configured to segment the overall playback of the recording into discrete content buckets, where each content bucket is representative of a new or updated view of the recording's visual content, such that a view of visual content of one content bucket is different from a view of visual content of a sequentially adjacent content bucket. Each content bucket includes information describing the view of visual content, as well as information describing audio content that is output during playback of the recording while the view of visual content is output. These content buckets and their corresponding information are used by the content-based navigation system to generate a content scale for the recording, which enables navigation of the recording relative to an amount of changes to views of visual content during playback of the recording at a granularity defined by the overall number of view changes to the recording's visual content. Using the content scale, the content-based navigation system is configured to generate a content navigation control for navigating the recording relative to changes in views of the recording's visual content. In some implementations, the content scale and content navigation control are embedded by the content-based navigation system into metadata of the recording, such that upon consumption of the recording by a content playback system, the content playback system is provided with the requisite information to enable navigating the recording on the basis of changes in visual content.

Thus, the described techniques and systems provided advantages not enabled by conventional approaches through the provision of a content navigation control, which enables navigation of the recording relative to changes in the recording's visual content in a time-independent manner. Because input to the content navigation control causes a content playback system to navigate among different views of visual content, the techniques described herein improve efficiency in computational resource consumption by navigating to a precise display of visual content through fewer iterations of navigational input. For example, in contrast to conventional approaches to navigating recordings on the basis of time, where multiple inputs may be required to navigate between temporally sequential changes in views of visual content, the techniques described herein enable navigation from a view of visual content to a new or updated view of visual content via a single input. Thus, the techniques described herein provide the technological advantage of navigating to a precise display of visual content in a manner that reduces an amount of computational resources required to perform a similar navigation using conventional approaches. Furthermore, because the content-based navigation system segments the recording into both time buckets and content buckets, the described techniques and systems enable navigating to different views of the recording's visual content without interrupting playback of the recording's audio content. In this manner, the described techniques and systems enable an experience that is otherwise unavailable via conventional computer-based educational platforms, where a student can quickly reference previously presented content without disrupting a flow of the recorded class by maintaining an uninterrupted playback of the recording's audio content.

In the discussions herein, various different implementations are described. Each implementation can be used on its own or in connection with one or more other implementations described herein. Further aspects of the techniques described herein relate to one or more of the following implementations.

In one implementation, in a digital medium environment to generate a version of a recording that is navigable based on changes in visual content of the recording, a method is implemented by at least one computing device, the method comprising: receiving, at the at least one computing device, a recording that includes visual content; determining, by the at least one computing device, a content scale for navigating the recording, the content scale including information describing a number of changes to a view of the visual content of the recording during playback of the recording; generating, by the at least one computing device, a content navigation control for the recording based on the content scale, the content navigation control being configured to enable navigation among different ones of the changes to the view of the visual content of the recording responsive to receiving input at the content navigation control; and outputting, by the at least one computing device, a content-navigable version of the recording that includes the content navigation control.

In another implementation, a system comprises: a content playback module implemented at least partially in hardware of at least one computing device and configured to output playback of a recording at a computing device, the recording including a control that is selectable via input to navigate the recording relative to a number of changes to a view of visual content of the recording during playback of the recording; a navigation module implemented at least partially in hardware of the at least one computing device and configured to receive input at the control and navigate to a different display of visual content of the recording based on the input; and the content playback module further configured to continue playback of the recording from a portion of the recording that includes the different display of the visual content.

In another implementation, in a digital medium environment to navigate a recording in a time-independent manner based on changes in visual content of the recording, a method is implemented by at least one computing device, the method comprising: outputting, by at least one computing device, synchronized playback of audio content and visual content of the recording, the recording including a content navigation control that is selectable via input to navigate the recording relative to a number of changes to a view of visual content of the recording during playback of the recording; receiving, by the at least one computing device, input at the content navigation control and navigating from a current display of visual content in the recording to a different display of the visual content in the recording according to the input while maintaining playback of the audio content of the recording; displaying, by the at least one computing device, a visual indication that the different display of the visual content is not synchronized with the audio content of the recording; and resuming, by the at least one computing device, synchronized playback of the visual content and the audio content of the recording responsive to receiving input at the visual indication.

Term Descriptions

As used herein, the term "time block" refers to a duration of time for which audio content and visual content of a recording is to be apportioned. A time block can span any duration of time, so long as the recording is apportioned into an integer number of time blocks. In this manner, a number of time blocks into which a recording is apportioned is dependent on a time block duration and an overall playback duration of the recording.

As used herein, the term "time scale" refers to the sequentially ordered aggregation of all time blocks generated for a recording, coupled with information describing the total number of time blocks into which the recording is apportioned. The time scale for a recording dictates a granularity at which the recording may be navigated on the basis of time. For example, a first recording having a playback duration of 5 minutes and a time scale indicating that the first recording is divided into 20 time blocks can be navigated at a finer granularity than a second recording having a playback duration of 5 minutes and a time scale indicating that the second recording is divided into 12 time blocks. In this manner, the time scale for a recording includes information describing a finite number of playback positions to which the recording can be navigated (e.g., by fast-forwarding or rewinding) on the basis of time.

As used herein, the term "content block" refers to a portion of a recording that includes a new or updated view of visual content, relative to a temporally adjacent portion of the recording. A content block is associated with a timestamp indicating a playback position in the recording, relative to an overall playback duration of the recording, at which the new or updated view of visual content of the content block is first displayed. A content block may be defined in terms of visual content length, where all visual content of a recording is modeled as a virtual document that runs into a definite vertical length. The vertical content length of a recording is determined by assigning a mathematical value to each content block based on an amount of space occupied by the visual content of the content block and summing the mathematical values of all content blocks generated for the recording.

As used herein, the term "content scale" refers to the sequentially ordered aggregation of all content blocks generated for a recording, coupled with information describing the total number of content blocks into which the recording is apportioned. The content scale for a recording dictates a granularity at which the recording may be navigated on the basis of content. For example, a first recording having a playback duration of 10 minutes and a content scale indicating that the first recoding includes 31 content blocks can be navigated at a coarser granularity on the basis of content, relative to a second recording having a playback duration of 10 minutes and a content scale indicating that the second recording includes 20 content blocks.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of manners. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described with respect to FIG. 11.

The computing device 102 is illustrated as including content-based navigation system 104. The content-based navigation system 104 represents functionality of the computing device 102 to create a content-navigable recording 106, which is representative of a version of a recording 108 that can be navigated based on changes to views of visual content of the recording 108. As described herein, the recording 108 includes visual content 110 and optionally audio content 112. The visual content 110 is representative of images, video, text, combinations thereof, and the like, included in a recording 108.

For instance, in an example implementation where the recording 108 represents a recorded educational class, the visual content 110 may be representative of a video that captures an instructor along with presented educational material. In some instances, the visual content 110 of the recording 108 is representative of separate instances of visual content. For example, in the implementation where the recording 108 represents a recorded educational class, the visual content 110 may be representative of a first video that captures presented educational information and a second video that captures a presenting instructor. Continuing this example, the first video of presented educational information may be a video feed of an instructor's computing device displaying equations, notes, and the like, which might otherwise be presented on a chalkboard, whiteboard, or projection screen in a conventional classroom setting. The second video of the instructor may visually capture the instructor during presentation of the educational material and be displayed together with the first video during playback of the recording 108 to mimic a student's presence in a physical classroom with the instructor during presentation of the educational material. Due to the continually changing characteristics of a video capturing an instructor during the class, the content-based navigation system 104 is configured to separately analyze visual content presented by the instructor and visual content consisting a recording of the instructor itself. In this context, a change to visual content 110 as used herein refers to changes in the visual content of the recording, exclusive of a portion of the recording dedicated to a display of the instructor.

The audio content 112 is representative of audio included in the recording 108, such as speech, music, background noise, and the like. Continuing the example where the recording 108 is a recorded educational class, the audio content 112 may, for instance, include an instructor's speech, speech from one or more participants physically present in the educational class, sound effects, audio from video presented during the educational class, background noise, and so forth. In this manner, the audio content 112 is synchronized with an output of the visual content 110 such that the recording 108 includes information presented both audibly and visually during a live event (e.g., class, presentation, etc.) from which the recording 108 was generated.

To generate the content-navigable recording 106 from the recording 108, the content-based navigation system 104 employs a time mapping module 114, a content mapping module 116, and a navigation module 118. The time mapping module 114, content mapping module 116, and navigation module 118 are implemented at least partially in hardware of the computing device 102 (e.g., through use of a processing system and computer-readable storage media), as described in further detail below with respect to FIG. 11.

To generate the content-navigable recording 106, the time mapping module 114 analyzes the recording 108 and generates a time scale for navigating the recording according to time increments. To do so, the time mapping module 114 determines a number of time blocks into which the recording 108 is to be apportioned. In an example scenario, the time mapping module 114 determines that the recording 108 is to be segmented into time blocks each spanning one second. Assuming in the example scenario that the recording 108 has a playback duration of 120 seconds, the time mapping module 114 models the recording 108 as 120 contiguous time blocks, where the first time block corresponds to the first second during playback of the recording and the 120th time block corresponds to the final second of during playback of the recording. Although described in the example context of using one second time blocks, the time mapping module 114 is configured to apportion a recording into time blocks spanning any duration. Given a duration associated with the individual time blocks, the time mapping module 114 generates a content slice for each time block, where each content slice includes visual content 110 and audio content 112 that are output during playback of the recording 108, over the duration specified by the time block. In this manner, each content slice may be associated with a timestamp indicating a time at which the content of the content slice is played back, relative to an overall playback duration of the recording 108. After segmenting the recording 108 into different time blocks and generating content slices for each time block, the time mapping module 114 is configured to generate a time scale for the recording 108.

As described herein, a time scale refers to the sequentially ordered aggregation of all time blocks generated for a recording, coupled with information describing the total number of time blocks in the recording. Given a time scale for the recording 108, the navigation module 118 is configured to generate a navigation control for navigating among various points in the recording 108, relative to an overall playback duration of the recording 108. After generating the time scale for the recording 108, the time scale and the time navigation control are stored in metadata of the content-navigable recording 106. In this manner, a content playback system, such as content playback system 120, is provided with the requisite information to enable navigation of the recording relative to an overall playback duration of the recording 108, without having to re-analyze the recording 108 to determine the recording 108's overall playback duration, determine timestamps associated with various time blocks of the recording 108, or generate a time navigation control for the recording 108.

In addition to the information provided by the time mapping module 114, the content-navigable recording 106 is generated with metadata describing a content scale for navigating the recording 108 based on changes in the recording's visual content 110. To do so, the content mapping module 116 analyzes a first frame of the visual content 110, which represents visual content 110 displayed at the beginning of playback of the recording 108. At regular intervals, such as at one second intervals, the content mapping module 116 analyzes a current frame of the recording 108 and determines whether visual content 110 of a subsequent frame is different from the visual content 110 of the current frame. In the event that the content mapping module 116 determines that a new, or updated, display of visual content 110 is being presented in the current frame, the content mapping module 116 records a playback timestamp defining an initial output time of the current frame along with a content position of the new, or updated, display of visual content 110 of the current frame.

As described herein and explained in further detail below with respect to FIG. 6, the content position of a frame's visual content 110 is determined using a sliding window algorithm. To facilitate the sliding window algorithm, the recording 108 is modeled as though each analyzed frame were compiled vertically, such that new or updated visual content 110 of a second frame is placed at the bottom of visual content 110 of a first frame, new or updated visual content 110 of a third frame is placed at the bottom of the second frame, and so forth. In this manner, the visual content 110 of the recording 108 can be modeled as a virtual document that vertically runs into a definite length. The vertical content length of the recording 108 is computed by assigning a range of mathematical values to visual content 110 based on an amount of screen space occupied by the visual content 110 and summing the mathematical values to determine the definite content length of the recording 108. For instance, a first display of visual content 110 may be assigned a content length of zero to one and a timestamp of $T_0$, while a second display of visual content 110 is assigned a content length of one to 1.8 and a timestamp of $T_1$. Through this mapping, the overall content length of the recording 108 can be defined, where each change in display of visual content 110 is associated with a content length and dedicated time value indicating its playback position in the recording 108. Each new or updated view of visual content 110 is assigned to a respective content block. After segmenting the recording 108 into different content blocks, the content mapping module 116 is configured to generate a content scale for the recording 108.

As described herein, a content scale refers to the sequentially ordered aggregation of the content blocks generated for the recording 108, coupled with information describing the total number of content blocks in the recording 108. Given a content scale for the recording 108, the navigation module 118 is configured to generate a content navigation control for navigating among various displays of visual content 110 in the recording, relative to an overall number of changes to the display of visual content 110 during playback of the recording 108, rather than relative to a playback duration of the visual content 110 or the overall recording 108. After generating the content scale for the recording 108, the content scale and the content navigation control are stored in metadata of the content-navigable recording 106. In this manner, a content playback system, such as content playback system 120, is provided with the requisite information to enable navigation of the recording relative to changes in visual content 110, without having to re-analyze the recording 108 to determine when changes in the visual content 110 occur, determine timestamps associated with changes in visual content, or generate a content navigation control for the recording 108. Operation of the time mapping module 114, the content mapping module 116, and the navigation module 118 is described in further detail below.

Figure 2:
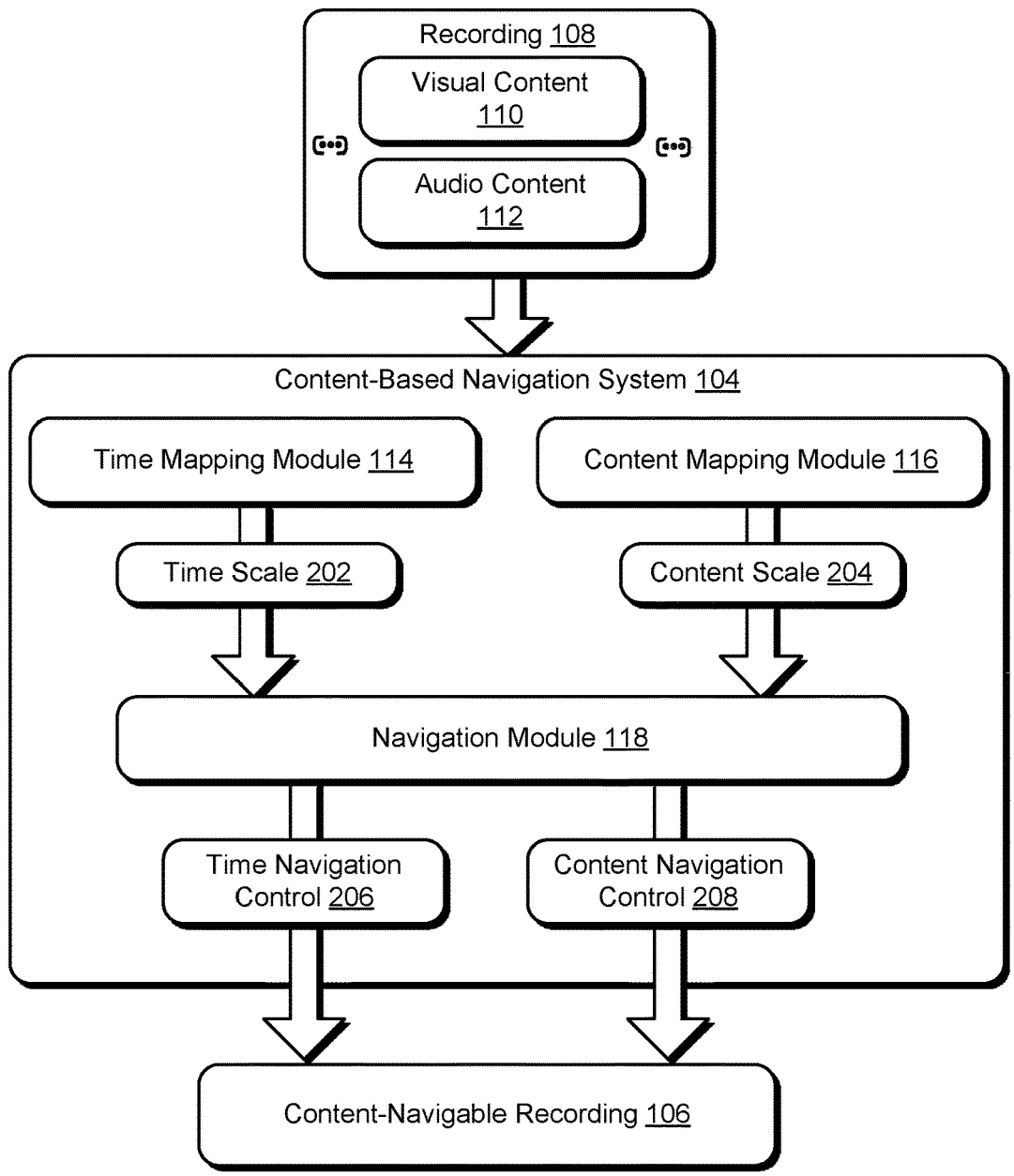
FIG. 2 illustrates an example implementation in which a content-based navigation system of FIG. 1 generates a content-navigable recording using techniques described herein.

FIG. 2 depicts a system 200 in an example implementation showing operation of the content-based navigation system 104 of FIG. 1 in greater detail as generating a content-navigable recording 106 from a recording 108 that includes visual content 110 and audio content 112. Using the techniques described herein, the content-navigable recording 106 is generated in a manner that enables navigating the content-navigable recording 106 relative to an overall playback duration, as well as relative to an overall number of changes to the visual content 110. The techniques described herein additionally enable navigating among various portions of the visual content 110 without interrupting a playback of the audio content 112, thereby enabling a user to quickly reference different portions of the visual content while maintaining a "live" playback of the audio content 112.

In the illustrated example, the time mapping module 114 receives the recording 108 and generates a time scale 202 for the recording. To do so, the time mapping module 114 determines a number of time blocks into which the recording 108 is to be apportioned. The time mapping module 114 is configured to apportion a recording into time blocks spanning any duration. Given a duration associated with the individual time blocks, the time mapping module 114 generates a content slice for each time block, where each content slice includes visual content 110 and audio content 112 that are output during playback of the recording 108, over the duration specified by the time block. In this manner, each content slice may be associated with a timestamp indicating a time at which the content of the content slice is played back, relative to an overall playback duration of the recording 108. The time scale 202 is thus representative of information describing the sequential ordering of all time blocks generated for the recording 108, along with information describing the total number of time blocks generated for the recording 108. Upon generating the time scale 202, the time mapping module 114 communicates the time scale 202 to the navigation module 118 for use in generating a time navigation control 206, as described in further detail below.

The content mapping module 116 also receives the recording 108 and generates a content scale 204 for the recording. To do so, the content mapping module 116 analyzes a first frame of the visual content 110, which represents visual content 110 displayed to a viewing user at the beginning of playback of the recording 108. At regular intervals, the content mapping module 116 analyzes a current frame of the recording 108 and determines whether visual content 110 of the subsequent frame is different from the visual content 110 of the previously analyzed frame. In the event that the content mapping module 116 determines that a new, or updated, display of visual content 110 is included in the current frame, the content mapping module 116 records a playback timestamp associated with the current frame, along with a content position of the current frame.

In some implementations, a content position for each new view of visual content 110 in the recording 108 may be determined using a sliding window algorithm, as described above with respect to FIG. 1 and as described in further detail below with respect to FIG. 6. In this manner, the visual content 110 of the recording 108 can be modeled as a virtual document that vertically runs into a definite length, where the length of the recording 108 is computed by assigning a range of mathematical values to visual content 110 based on an amount of screen space occupied by the visual content 110 and summing the mathematical values to determine the definite content length of the recording 108. Given this information, the content mapping module generates the content scale 204, which represents the sequentially ordered aggregation of all content blocks generated for the recording 108, coupled with information describing the total number of content blocks in the recording 108. Upon generating the content scale 204, the content mapping module 116 communicates the content scale 204 to the navigation module 118 for use in generating a content navigation control 208.

The navigation module 118 is representative of functionality of the content-based navigation system 104 to generate a time navigation control 206 for inclusion in the content-navigable recording 106. As described herein, the time navigation control 206 is representative of a control, such as a horizontal scroll bar, that indicates a current playback position in the content-navigable recording 106 relative to an overall playback duration of the recording 108. The time navigation control 206 is configured to enable navigation of the content-navigable recording 106 at a granularity that is dependent on an overall number of time blocks generated for the recording 108 by the time mapping module 114.

For instance, in an example scenario where the time navigation control is a horizontal scroll bar and the time mapping module 114 generates 100 time blocks for the recording 108, advancing a current-position indicator of the time navigation control 30% of a total length of the time navigation control causes the content-based navigation system to navigate 30 time blocks forward in the content-navigable recording 106. Conversely, if only 50 time blocks were generated for the recording 108, advancing a current-position indicator of the time navigation control 206 by 30% of a total length of the time navigation control 206 would cause the content-based navigation system 104 to navigate 15 time blocks forward in the content-navigable recording 106. Thus, based on input received at the time navigation control 206, the content-based navigation system 104 is configured to identify a time block and corresponding time stamp leveraging information included in the time scale 202, and enable navigation of the content-navigable recording relative to an overall playback duration of the recording 108.

The navigation module 118 is also representative of functionality of the content-based navigation system 104 to generate a content navigation control 208 for inclusion in the content-navigable recording 106. As described herein, the content navigation control 208 is representative of a control, such as a vertical scroll bar, that indicates a current playback position in the content-navigable recording 106 relative to an overall number of new or updated views of visual content 110 in the recording 108. The content navigation control 208 is configure to enable navigation of the content-navigable recording at a granularity that is dependent on an overall number of content blocks generated for the recording 108 by the content mapping module 116.

In this manner, the content navigation control 208 enables navigation of the content-navigable recording 106 independent of a playback duration associated with each new or updated view of the visual content 110. For instance, in an example scenario where the time navigation control is a vertical scroll bar and the content mapping module 116 generates 20 content blocks for the recording 108, advancing a current-position indicator of the content navigation control 208 by 60% of a total length of the content navigation control 208 would cause the content-based navigation system 104 to navigate 12 content blocks forward in the content-navigable recording 106.

Conversely, if 80 content blocks were generated for the recording 108, advancing a current-position indicator of the content navigation control 208 by 60% of a total length of the content navigation control 208 would cause the content-based navigation system 104 to navigate 48 content blocks forward in the content-navigable recording 106. Thus, based on input received at the content navigation control 208, the content-based navigation system 104 is configured to identify a content block and corresponding time stamp leveraging information included in the content scale 204, and enable navigation of the content-navigable recording relative to an overall number of new and updated views of visual content 110, independent of playback durations of individual ones of the new and updated views of visual content 110.

The navigation module 118 is configured to store both the time navigation control 206 and the content navigation control 208, along with the corresponding information provided by the time scale 202 and the content scale 204, in metadata of the content-navigable recording 106. In this manner, a content playback system, such as the content playback system 120 of FIG. 1, is provided with the requisite information to enable navigation of the content-navigable recording 106 on the basis of both time and content, individually and separate from one another. Having considered operation of the content-based navigation system 104, consider an example of generating a time scale for the recording 108.

Figure 3:
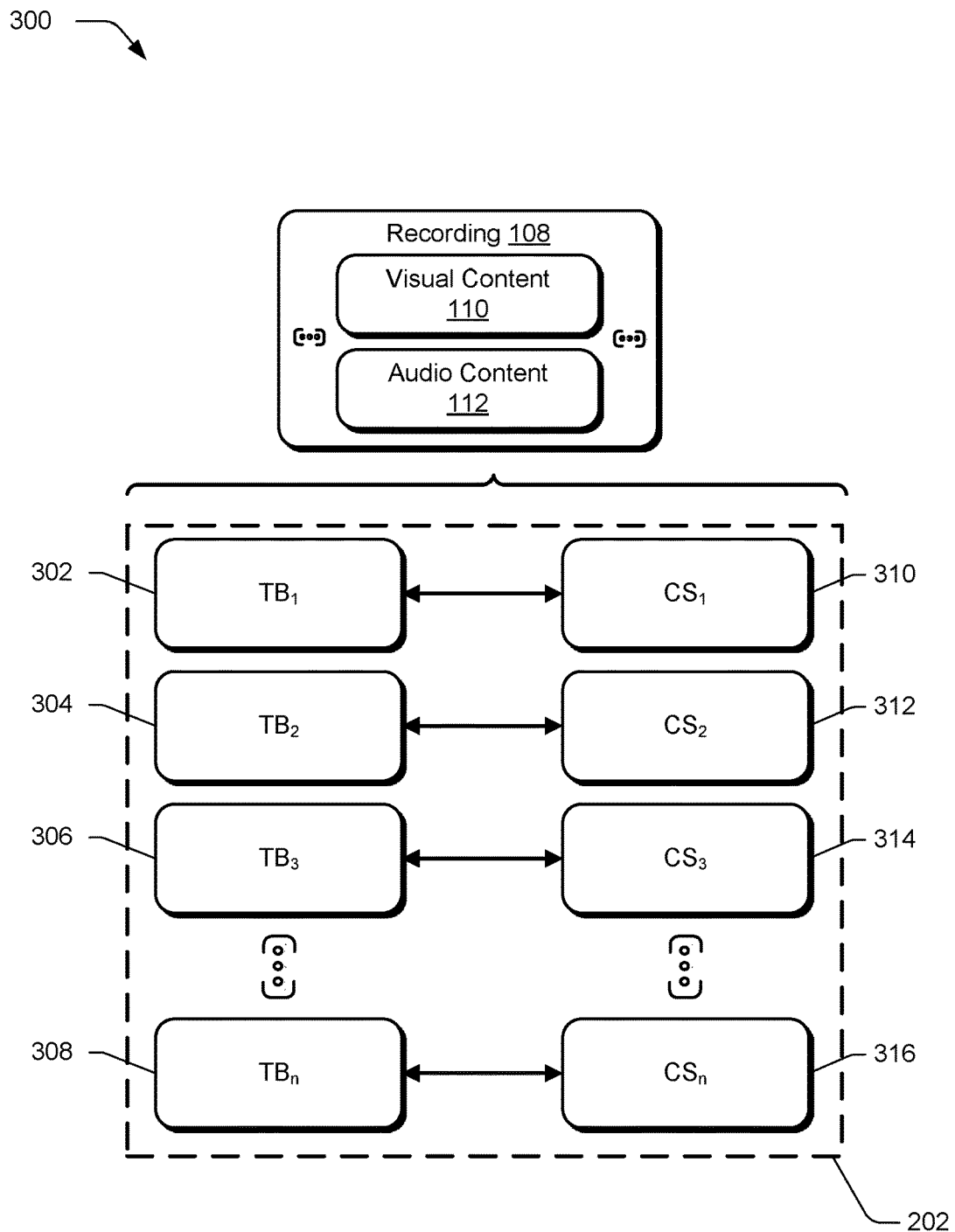
FIG. 3 illustrates the content-based navigation system of FIG. 1 parsing a recording to generate a time scale for the recording in accordance with one or more implementations.

FIG. 3 illustrates an example implementation 300 of the content-based navigation system 104 parsing the recording 108 in a manner that is useable to generate a time scale for navigating the recording relative to its playback duration using the techniques described herein. The illustrated example is representative of the time mapping module 114 generating the time scale 202. In the illustrated example, the visual content 110 and the audio content 112 of the recording 108 are illustrated as being mapped into time buckets 302, 304, 306, and 308. Each of the time buckets 302, 304, 306, and 308 represent equidistant segments of visual content 110 and audio content 112 of the recording, spanning one time unit. Using the techniques described herein, any amount of time may be used to specify a duration of each time bucket 302, 304, 306, and 308.

Thus, time bucket 302 represents a first time segment of the recording 108 and time bucket 308 represents an nth time segment of the recording 108, when the recording is separated into n equidistant time segments. Using the techniques described herein, the recording 108 may be segmented into any number of equidistant time segments to generate the time buckets 302, 304, 306, and 308. Each of the time buckets is mapped to visual content 110 and audio content 112 output by the recording during the time segment encompassed by the respective time bucket. This mapping is represented by the content slices 310, 312, 314, and 316, which are each representative of visual content 110 and audio content 112 that are output during playback of the recording 108 during the time segment represented by the corresponding time bucket. In this manner, the mapping of visual content 110 and audio content 112 included in each time bucket can be represented by Equation 1, in a scenario where recording 108 is segmented into x time buckets:

$$C(T_x) = \sum_{n=1}^{x} (C(T_n)) \qquad \text{(Eq. 1)}$$

Having considered an example of generating a time scale for the recording 108, consider an example of generating a content scale for the recording 108.

Figure 4:
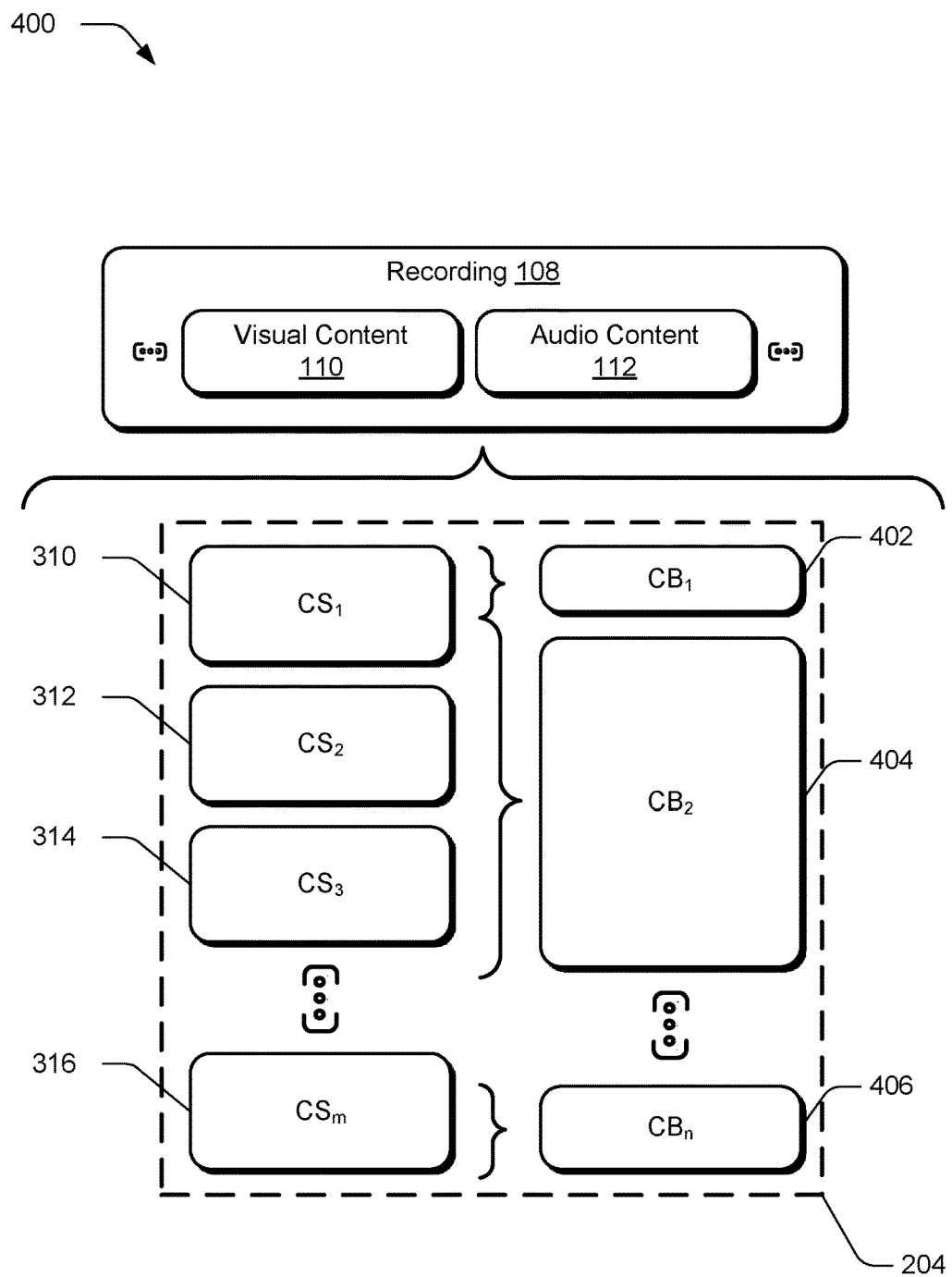
FIG. 4 illustrates the content-based navigation system of FIG. 1 parsing a recording to generate a content scale for the recording in accordance with one or more implementations.

FIG. 4 illustrates an example implementation 400 of the content-based navigation system 104 parsing the recording 104 in a manner that is useable to generate a content scale for navigating the recording relative to an overall number of new or updated views of visual content using the techniques described herein. The illustrated example is representative of the content mapping module 116 generating the content scale 204. In the illustrated example, visual content 110 and audio content 112 of the recording are mapped into content buckets 402, 404, and 406. Each of the content buckets 402, 404, and 406 represent a new or updated view of visual content 110, along with audio content 112 output coinciding with the respective new of updated view of visual content represented by the content bucket.

In some implementations, the content mapping module 116 determines a number of content buckets to be created for the recording 108 by applying a sliding window algorithm to identify new or updated views of visual content 110, as described in further detail below with respect to FIG. 6. Thus, content bucket 402 represents a first view of visual content 110 and content bucket 406 represents a final view of visual content 110 output during uninterrupted playback of the recording 108. As such, no two adjacent content buckets include the same view of visual content 110.

As depicted in the example implementation 400, a number of content buckets generated for the recording 108 is not constrained by the number of content slices generated for the recording. For instance, content bucket 402 is illustrated as including only a portion of the recording 108's content included in content slice 310. Content bucket 404 is illustrated as including the remaining portion of the content included in content slice 310, as well as all content of content slices 312 and 314 and content that would be included in at least one content slice represented by the ellipses separating content slice 314 and content slice 316. Content bucket 406 includes a portion of the recording 108's content represented by content slice 316.

Thus, individual ones of the content buckets 402, 404, and 406 may include different amounts of visual content 110 and audio content 112, relative to one another, and are not constrained by the limits of individual ones of the content slices 310, 312, 314, and 316. Accordingly, the content mapping module 116 is configured to generate content buckets that each represent a new or updated view of the recording's visual content 110, independent of a duration of time associated with the new or updated view. In this manner, the content-based navigation system 104 generates the content scale 204 to include a defined number of content buckets, which can be used by the navigation module 118 to generate a content navigation control 208, where a granularity of navigating among changes to visual content 110 is dictated by an overall number of content buckets generated for the recording 108.

Having considered an example of generating a content scale for the recording 108, consider an example user interface for navigating a content-navigable recording in a content playback system using the techniques described herein.

Figure 5:
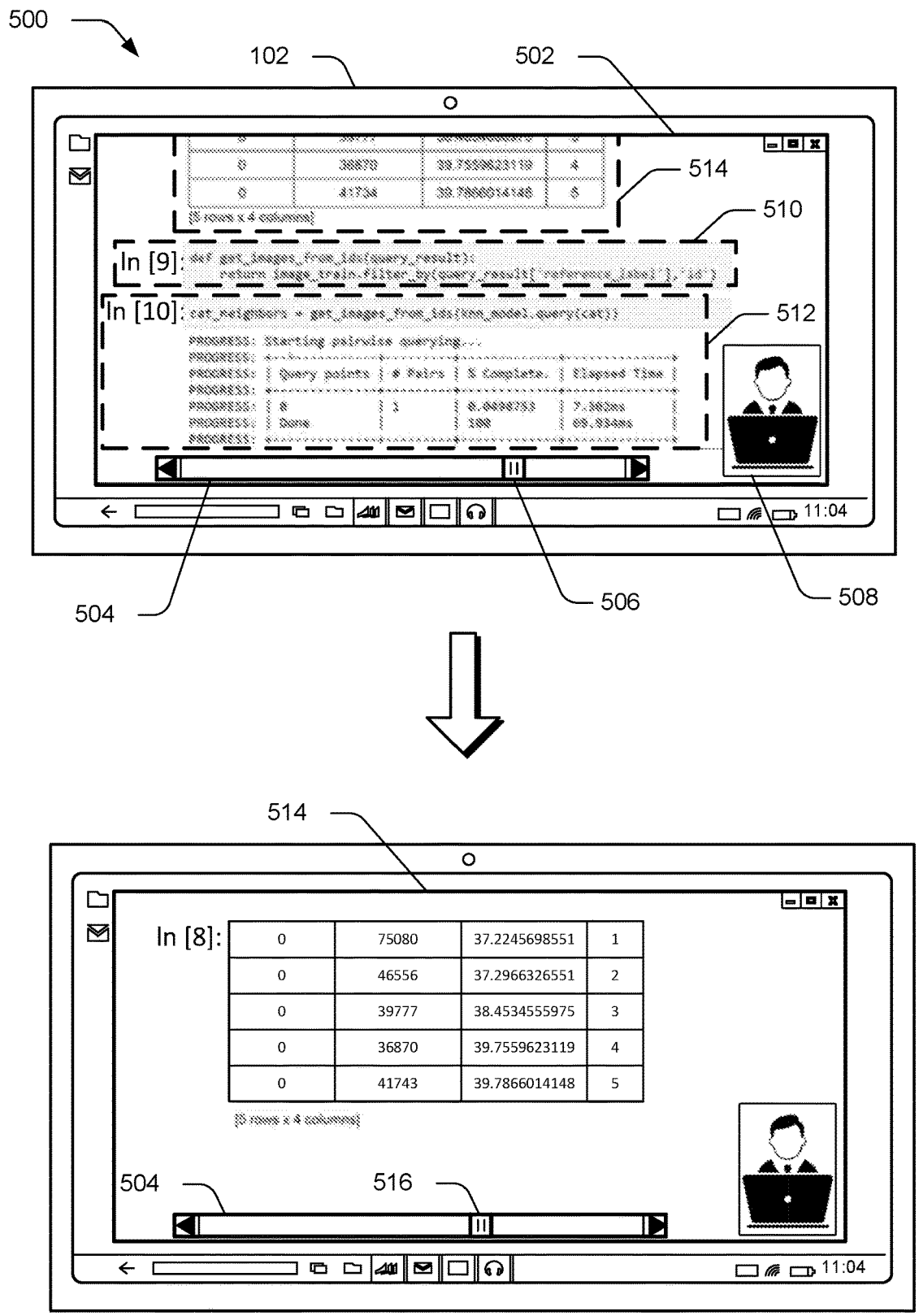
FIG. 5 illustrates example user interfaces for the content-based navigation system of FIG. 1 in accordance with one or more implementations.

FIG. 5 depicts an example implementation 500 of a content playback system displaying a user interface of a content-navigable recording generated using the techniques described herein, such as the content playback system 120 implemented by computing device 102, as illustrated in FIG. 1. Specifically, FIG. 5 depicts a user interface 502 of a content playback system outputting content of a content-navigable recording generated from a recording of a live educational class. In the illustrated example, the user interface 502 includes a time navigation control 504, represented as a horizontal scroll bar, with a current-position indicator 506 indicating a position of the content being output relative to an overall playback duration for the content-navigable recording. The user interface 502 further includes a visual display of an instructor 508, along with different visual content included as part of the educational class.

The educational class of the illustrated example is representative of a class session recorded in the form of a video that includes the instructor 508 presenting a concepts involving compiled computer code. For example, the current view of visual content displayed in user interface 502 includes line 9 of computer code, illustrated in the dashed outline 510, in addition to line 10 of computer code, illustrated in the dashed outline 512. The user interface 502 further includes a partial display of visual content displayed as part of line 8 of computer code, which is illustrated in the dashed outline 514. In the illustrated example, visual content included in the dashed outline 514 is representative of content presented as part of the class prior to line 9, with subsequently presented content populating the user interface below previously presented content being pushed vertically out of the frame bounding user interface 502.

In order to navigate to a portion of the recorded class that includes a full display of the information included in line 8 via the time navigation control 504, input may be received at the current-position indicator 506 and moved to the left along the time navigation control 504 to a position that coincides with a full display of content associated with line 8, as illustrated in the user interface 514. In user interface 514, the current-position indicator of the time navigation control 504 is illustrated as being moved left to position 516, which correlates to a point during playback of the recorded class where the instructor 508 was presenting content associated with line 8 and before presenting content associated with line 9. Thus, the current-position indicator can be moved along the time navigation control to navigate the content-navigable recording 106 relative to an overall playback duration and cause output of visual content 110 and audio content 112 that coincides with the current position indicator.

To identify visual content 110 and audio content 112 of the content-navigable recording that correlates to a position of the current-position indicator, the content playback system 120 leverages information provided by the time scale 202, as stored in metadata of the content-navigable recording 106. In this manner, a precision at which the content-navigable recording 106 can be recorded using the time navigation control 504 is constrained only by a number of time buckets generated by the time mapping module 114. For instance, in an example scenario where the time mapping module 114 generated 100 different time buckets for the content-navigable recording 106, the current position indicator of the time navigation control 504 can be moved via input to any of 100 different positions, which will correlate to one of 100 different content slices representing visual content 110 and audio content 112, as described and illustrated with respect to FIG. 3.

However, because a substantial amount of time may have elapsed between the respective outputs of content represented by the user interfaces 502 and 514, a user wishing to quickly review all content associated with line 8 may be forced to guess as to how much time has elapsed since the view of user interface 514 and repeatedly alter a position of the current-position indicator on the time navigation control before arriving at the view of user interface 514. This can be particularly disruptive in the context of navigating an educational recording, where similar operations may be required in order for the user to resume learning at the temporal position of the recording displayed by user interface 502. To remedy these problems, the content-based navigation system 104 also provides a content navigation control, which enables navigation of a recording in a time-independent manner.

Figure 6:
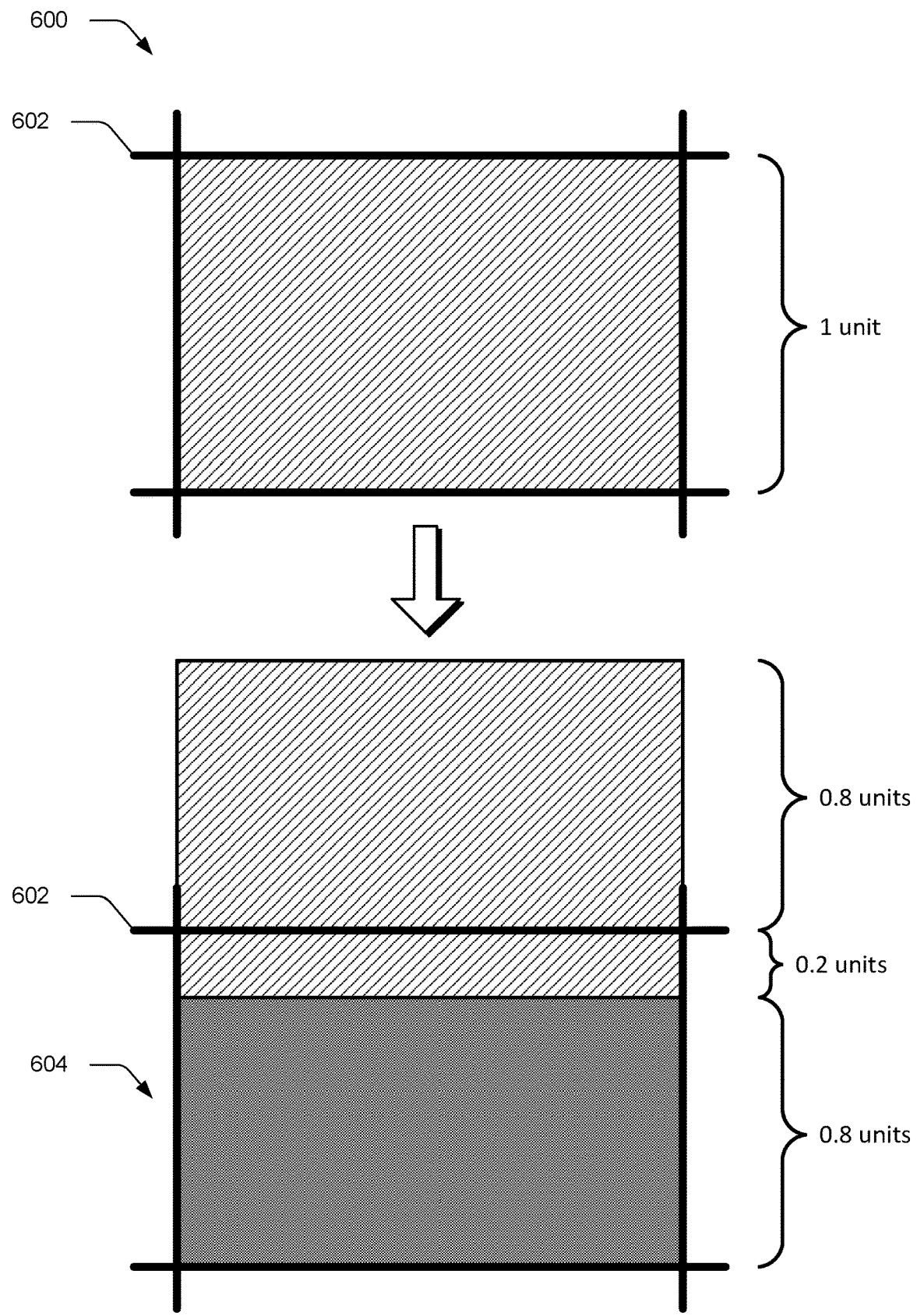
FIG. 6 illustrates the content-based navigation system of FIG. 1 identifying changes in visual content of a recording using sliding window segmentation in accordance with one or more implementations.

FIG. 6 depicts an example implementation 600 of the content-based navigation system 104 generating content buckets for a recording by applying a sliding window algorithm to the recording. To do so, the content-based navigation system 104 models the recording as a vertical document, where subsequently presented visual content of the recording is appended to the bottom of previously-presented visual content, such that the recording is modeled as having a definite vertical length. The overall length of the recording 108 is computed by assigning a range of mathematical values to visual content 110 based on an amount of screen space occupied by the visual content 110 and summing the mathematical values to determine the definite content length of the recording 108.

In some implementations, content length of the recording 108 is determined using a sliding window 602 having a defined length of one unit. In some implementations, the sliding window 602 may be defined based on a corresponding size of a user interface for the recording 108, such as defined based on a size of the user interfaces 502 and 514, as illustrated in FIG. 5. Visual content occupying the entirety of the user interface 502 may thus be assigned a content length spanning zero to one, which is representative of an initial display of visual content 110 of the recording 108. The content mapping module 116 of the content-based navigation system 104 then proceeds to analyze each new or updated view of visual content 110 relative to the sliding window 602. To do so, the content mapping module 116 initiates playback of the recording 108 and at regular intervals compares visual content 110 of a current sliding window to visual content 110 of a previous sliding window.

For example, the example implementation at 604 illustrates a comparison of visual content 110 included in the sliding window 602 relative to visual content 110 included in the sliding window 602 at a previous interval. In the illustrated example, the sliding window 602 is illustrated as including 0.8 units of new visual content 110 that was not included in the previous interval. In this example, the shaded content in the sliding window 602 of the example implementation 600 is assigned a content length spanning from zero to one, and is associated with a timestamp that identifies a point in the overall playback duration at which the shaded content of the example implementation 600 first appeared during playback of the recording 108. Likewise, the shaded content occupying 0.8 units of the sliding window 602 in the example implementation 604 is assigned a content length spanning from one to 1.8, and is associated with a timestamp that identifies a point in the overall playback duration at which the shaded content of the example implementation 604 first appeared during playback of the recording 108.

This sliding window analysis is continued at regular intervals until the entirety of the recording 108 has been analyzed, and the mapping of new or updated views of visual content 110 and their respective timestamps are recorded in the content scale 204, thereby enabling retrieving corresponding content when a user navigates the content-navigable recording using a content navigation control. In this manner, applying a sliding window algorithm to the visual content 110 of the recording 108 provides the content-based navigation system 104 with the requisite information to generate content scale 204 that is useable by the navigation module to generate content navigation control 208, as described and illustrated with respect to FIG. 2.

Having considered an example of identifying changes to views of visual content in the recording 108, consider an example user interface for navigating a content-navigable recording relative to an overall number of visual content view changes using the techniques described herein.

Figure 7:
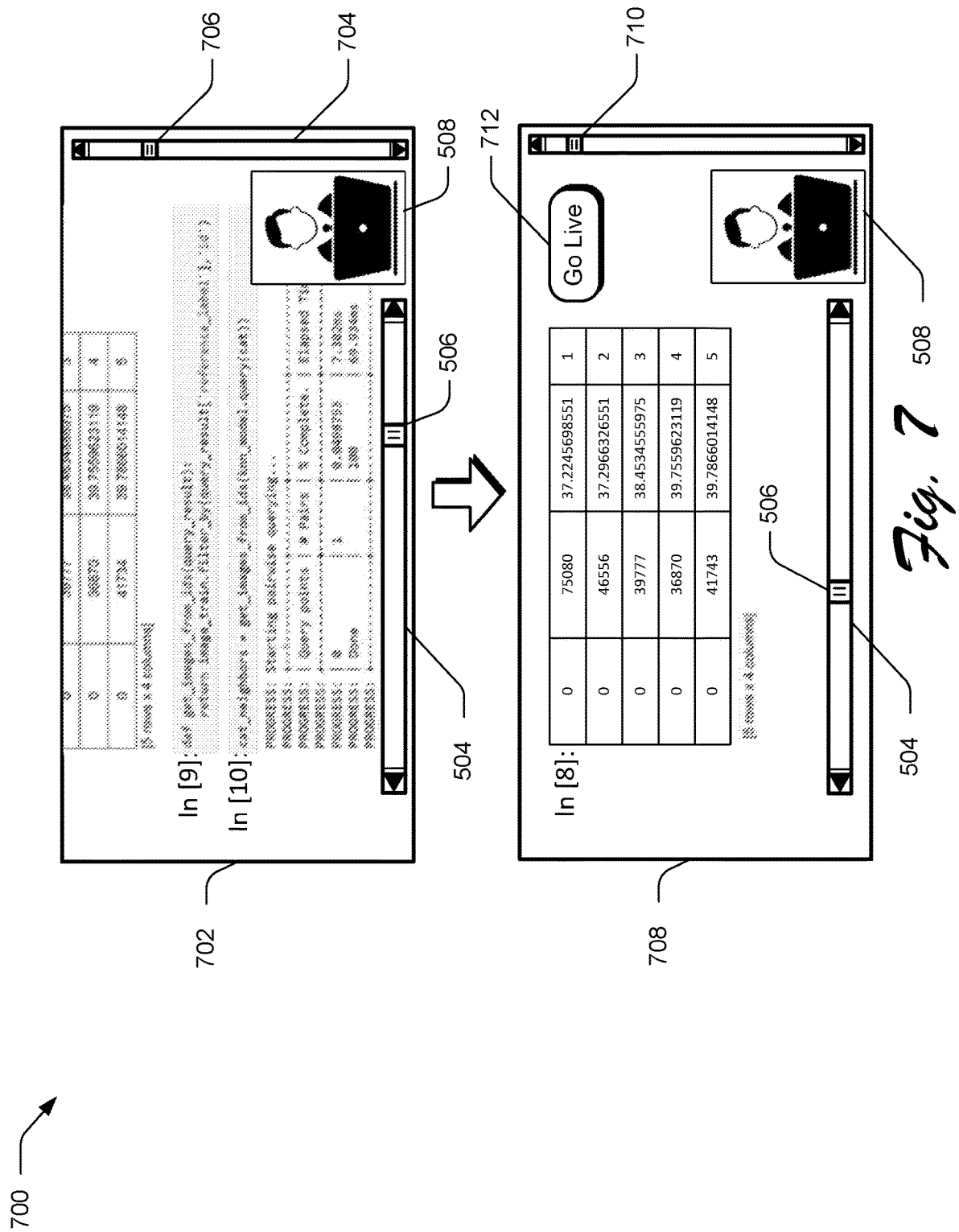
FIG. 7 illustrates example user interfaces for the content-based navigation system of FIG. 1 in accordance with one or more implementations.

FIG. 7 depicts an example implementation 700 of a content playback system displaying a user interface of a content-navigable recording generated using the techniques described herein, such as the content playback system 120 implemented by computing device 102, as illustrated in FIG. 1. Specifically, FIG. 7 depicts a user interface 702 of a content playback system outputting visual content 110 of a recording 108. In the illustrated example, user interface 702 includes a display of visual content 110 for a video recording of a live educational class. The user interface 702 is illustrated as including a content navigation control 704, represented as a vertical scroll bar, with a current-position indicator 706 indicating a position of the visual content 110 being output relative to an overall number of changes to views of the visual content 110 during playback of the content-navigable recording 106. The user interface 702 is further illustrates as including a visual display of an instructor 508, which may be a video recording of the instructor presenting visual content 110 of the recorded class, along with a time navigation control 504, illustrated as the horizontal scroll bar 504, as described and illustrated with respect to FIG. 5.

Similar to the illustrated example of FIG. 5, visual content 110 of the educational class recording displayed by user interface 502 represents a video that includes the instructor 508 presenting concepts involving compiled computer code. Specifically, the visual content 110 displayed by user interface 702 includes a display of visual content 110 relating to lines 9 and 10 of computer code, while including only a portion of visual content 110 associated with line 8, where the remainder of visual content 110 associated with line 8 has been pushed vertically outside display bounds of the user interface 702 to make room for subsequently presented visual content 110.

In order to navigate to a portion of the recorded class that includes a full display of the information included in line 8 via the content navigation control 704, input may be received at the current-position indicator 706 and moved up along the content navigation control 704 to a position that coincides with a full display of content associated with line 8, as illustrated in the user interface 708. In user interface 708, the current-position indicator of the time navigation control is illustrated as being moved upwards to position 710, which correlates to a point during playback of the recorded class where visual content 110 associated with line 8 was first displayed.

Because a granularity at which the content-navigable recording 106 can be navigated using the content navigation control is dependent on changes to views of visual content 110, the distance required to move position indicator 706 to reach the view of user interface 708 may vary based on an overall number of changes to views of visual content 110 in the content-navigable recording 106. For instance, in an example implementation where the content-navigable recording 106 includes 30 different views of visual content 110, the current-position indicator of the content navigation control 704 can be moved to one of 30 different positions on the content navigation control 704. In accordance with one or more implementations, the different positions to which the current-position indicator can be moved on the content navigation control 704 are spaced equidistant from one another, such that moving the current-position indicator a certain distance corresponds with a number of changes in views of visual content 110, rather than corresponding to an amount of time that each view of visual content 110 was displayed during normal playback of the content-navigable recording 106.

For instance, assuming that visual content 110 associated with lines 8, 9, and 10 each represent a new or updated view of visual content, navigating from user interface 702 to user interface 708 can be achieved by moving the position indicator up two positions on the content navigation control from the position illustrated in user interface 702 to position 710 as indicated in user interface 708. Thus, the current-position indicator can be moved along the content navigation control to navigate the content-navigable recording 106 relative to an overall number of changes to views of visual content 110. Moving the current-position indicator along the content navigation control 704 causes the content playback system 120 to initiate an output of visual content 110 and audio content that coincides with the current position indicator.

To identify visual content 110 and audio content 112 of the content-navigable recording that correlates to a position of the current-position indicator, the content playback system 120 leverages information provided by the content scale 204, as stored in metadata of the content-navigable recording 106. In this manner, navigating the content-navigable recording 106 using the content navigation control 704 is constrained only by a number of content buckets generated by the content mapping module 116. For instance, in an example scenario where the content mapping module 116 generated 43 different content buckets for the content-navigable recording 106, the current-position indicator can be moved to any of 43 different positions along the content navigation control 704, which each correlate to one of the 43 different content buckets representing new or updated views of visual content 110, and including associated audio content 112, as described and illustrated with respect to FIG. 4.

Because timestamps associated with each new or updated view of visual content 110 are determined by the content mapping module 116 via use of the sliding window algorithm, the content playback system outputting the content-navigable recording 106 is provided with the requisite information to readily identify at least one of visual content 110 or audio content 112 that corresponds to a location of the current position indicator relative to the content navigation control 704. In some implementations, navigating the content-navigable recording 106 using the current-position indicator of the content navigation control 704 causes current position indicator 506 of the time navigation control 504 to also move to a position along the time navigation control 504 that corresponds to the timestamp associated with the current view of visual content 110. As indicated by the movement of position indicator 506 between user interfaces 702 and 708, a relationship between the content scale 204 used to generate the content navigation control 704 and the time scale 202 used to generate the time navigation control 504 is not necessarily linear. Rather, the relative movement of the current-position indicators along the time navigation control 504 and the content navigation control 704 are constrained respectively by a number of time buckets and content buckets generated for the content-navigable recording 106.

In some implementations, navigating the content-navigable recording 106 using the content navigation control 704 alters an output of visual content 110 without affecting an output of audio content 112 of the content-navigable recording 106. For instance, in an example implementation where the content-navigable recording 106 is a video recording of an educational class, a viewing user wants to quickly reference visual content associated with line 8 as displayed in user interface 708 without interrupting the overall flow of the educational class. This may occur when the instructor 508 is verbally discussing visual content 110 associated with line 10, as illustrated in user interface 702, but references visual content associated with line 8 that is included in the view provided by user interface 708 but not in the view provided by user interface 708. In such a scenario, the user may wish to continue listening to audio content 112 associated with the view provided by user interface 702 while viewing the visual content 110 of the view provided by user interface 708.

The content-based navigation system 104 is configured to enable such a view by altering only an output of visual content 110 without altering an output of audio content 112, in response to receiving input that changes a location of the current-position indicator along the content navigation control 704. In such a scenario, the content-based navigation system 104 is configured to display a visual indicator 712 that informs the user that the current view of visual content 110 is not synchronized with the current output of audio content 112 for the content-navigable recording 106. In some implementations, the visual indicator 712 is selectable via input to synchronize outputs of the content-navigable recording 106's visual content 110 and audio content 112, such that the user is returned to a "live" portion of the recording.

In some implementations, determining whether to alter an output of only visual content 110 or both visual content 110 and audio content 112 in response to receiving input changing a location of the current-position indicator along the content navigation control 704 is dependent on a type of the received input. For instance, the content playback system 120 may be configured to alter an output of both visual content 110 and audio content 112 in response to a left-click input moving the current-position indicator along the content navigation control 704 and alter only an output of visual content in response to a right-click input moving the current-position indicator along the content navigation control 704.

Alternatively or additionally, the content playback system 120 may be configured to differentiate among types of gesture input, such that a one-finger input applied to the content navigation control 704 results in altering an output of visual content 110 only, while a multi-finger gesture input applied to the content navigation control 704 results in altering an output of both visual content 110 and audio content 112 of the content-navigable recording 106. In this manner, the content navigation control 704 can be implemented in a variety of different configurations. For instance, the content navigation control 704 may be configured as a horizontal scroll bar.

Alternatively or additionally, the content navigation control 704 may be configured as a bounded box that is not visibly displayed and is configured to receive input within a defined area of the user interfaces 702 and 708. In addition to configuring the content navigation control 704 as a linear control, the content playback system 120 may configure the content navigation control as a scroll wheel, as selectable previous and next buttons, combinations thereof, and so forth. Likewise, the content navigation control 704 may be configured to enable navigation using any manner or number of inputs, such as multi-touch gesture inputs (e.g., multiple vertical swipes, multiple taps, etc.). Regardless of a configuration of the content navigation control 704 implemented by the content playback system 120, the content playback system 120 is provided with the requisite information to navigate the content-navigable recording 106 relative to an overall number of changes to views of visual content 110 in the recording, via the information provided by the content scale 204 included in metadata of the content-navigable recording 106. Thus, the content navigation control 704 enables navigation of the content-navigable recording 106 in a time-independent manner.

Having discussed example details of the techniques for generating a content-navigable recording, consider now some example procedures to illustrate additional aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-7.

Figure 8:
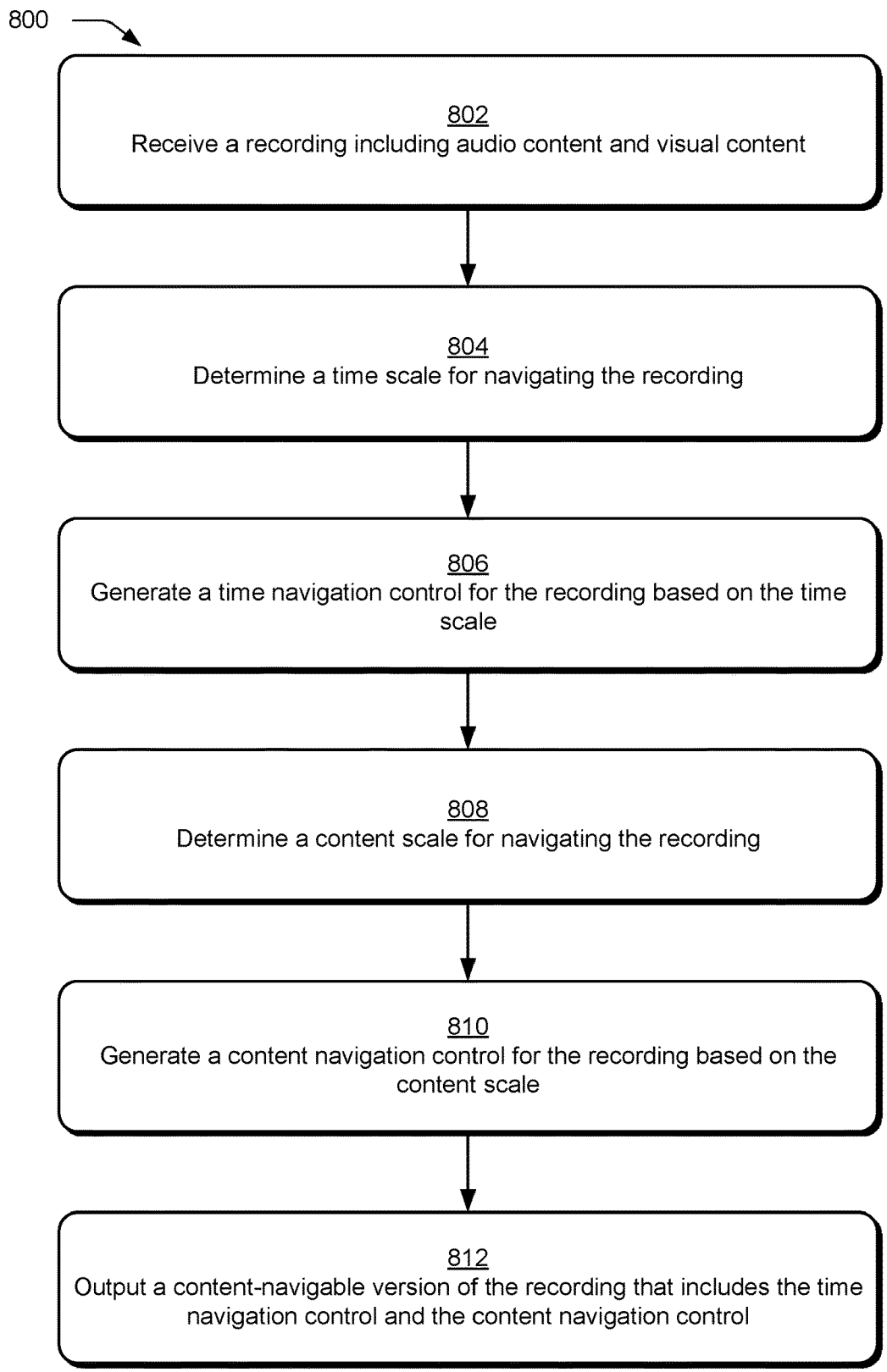
FIG. 8 is a flow diagram depicting a procedure in an example implementation for generating a content-navigable recording using the techniques described herein.

FIG. 8 depicts a procedure 800 in an example implementation of generating a content-navigable recording using the techniques described herein. A recording including audio content and visual content is received (block 802). The computing device implementing the content-based navigation system 104, for instance, receives the recording 108 including visual content 110 and audio content 112, from which the content-navigable recording 106 is to be generated.

In response to receiving the recording, a time scale for navigating the recording relative to an overall playback duration of the recording is determined (block 804). The time mapping module 114, for instance, determines a time interval for use in generating time buckets for the recording 108, such as time buckets 302, 304, 306, and 308, as illustrated in FIG. 3. For each time bucket, the time mapping module 114 generates a content slice that includes visual content 110 and audio content 112 of the recording that would be output during the duration of time specified by the corresponding time bucket. For example, the time mapping module 114 may generate content slices 310, 312, 314, and 316, as illustrated in FIG. 3.

Given the time scale, a time navigation control is generated for the recording (block 806). The navigation module 118, for instance, determines a granularity at which the content-navigable recording 106 may be navigated on the basis of time using information provided by the time scale 202 and generates the time navigation control 206 that enables navigation of the content-navigable recording 106 incrementally among the time buckets described by the time scale 202. In some implementations, the navigation module 118 configures the time navigation control 206 as a horizontal scroll bar that includes a current-position indicator indicating a current playback position of the content-navigable recording 106 relative to its overall playback duration, such as the time navigation control 504 of FIG. 5.

Additionally, a content scale for navigating the recording relative to an overall number of changes to views of visual content in the recording is determined (block 808). The content mapping module 116, for instance, determines a number of changes to views of visual content 110 in the recording, which are each representative of a new or updated view of visual content 110. To do so, the content mapping module 116 employs a sliding window algorithm at regular intervals to determine whether visual content 110 has changed relative to a previous interval. For each change in visual content 110, the content mapping module 116 determines a content length for the visual content 110 encompassed by the change and identifies a timestamp corresponding to the beginning of output of the visual content 110 encompassed by the change relative to a playback duration of the content-navigable recording 106. The content mapping module then generates a content bucket representing each change in visual content, such as content buckets 402, 404, and 406, as illustrated in FIG. 4. Each content bucket is generated to include visual content 110 and audio content 112 of the content-navigable recording that are output before a subsequent new or updated view of visual content 110.

Given the content scale, a content navigation control is generated for the recording (block 810). The navigation module 118, for instance, determines a granularity at which the content-navigable recording 106 may be navigated on the basis of changes in visual content 110 using information provided by the content scale 204 and generates the content navigation control 208, which enables navigation of the content-navigable recording 106 incrementally among the content buckets descried by the content scale 204. In some implementations, the navigation module 118 configures the content navigation control 208 as a vertical scroll bar that includes a current-position indicator indicating a current view of visual content 110 of the content-navigable recording 106 relative to an overall number of changes to views of the visual content 110, such as the content navigation control 704 of FIG. 7.

The content-navigable version of the recording that includes the time navigation control and the content navigation control is then output (block 812). The content-based navigation system 104, for instance, outputs the content-navigable recording 106, which includes the visual content 110 and the audio content 112 of the recording 108, in addition to the time navigation control 206 and the content navigation control 208. The content-navigable recording 106 is additionally output including information describing the time scale 202 and the content scale 204, such that the content playback system 120 can alter a configuration of at least one of the time navigation control 206 or the content navigation control 208 without having to analyze content of the recording 108.

Figure 9:
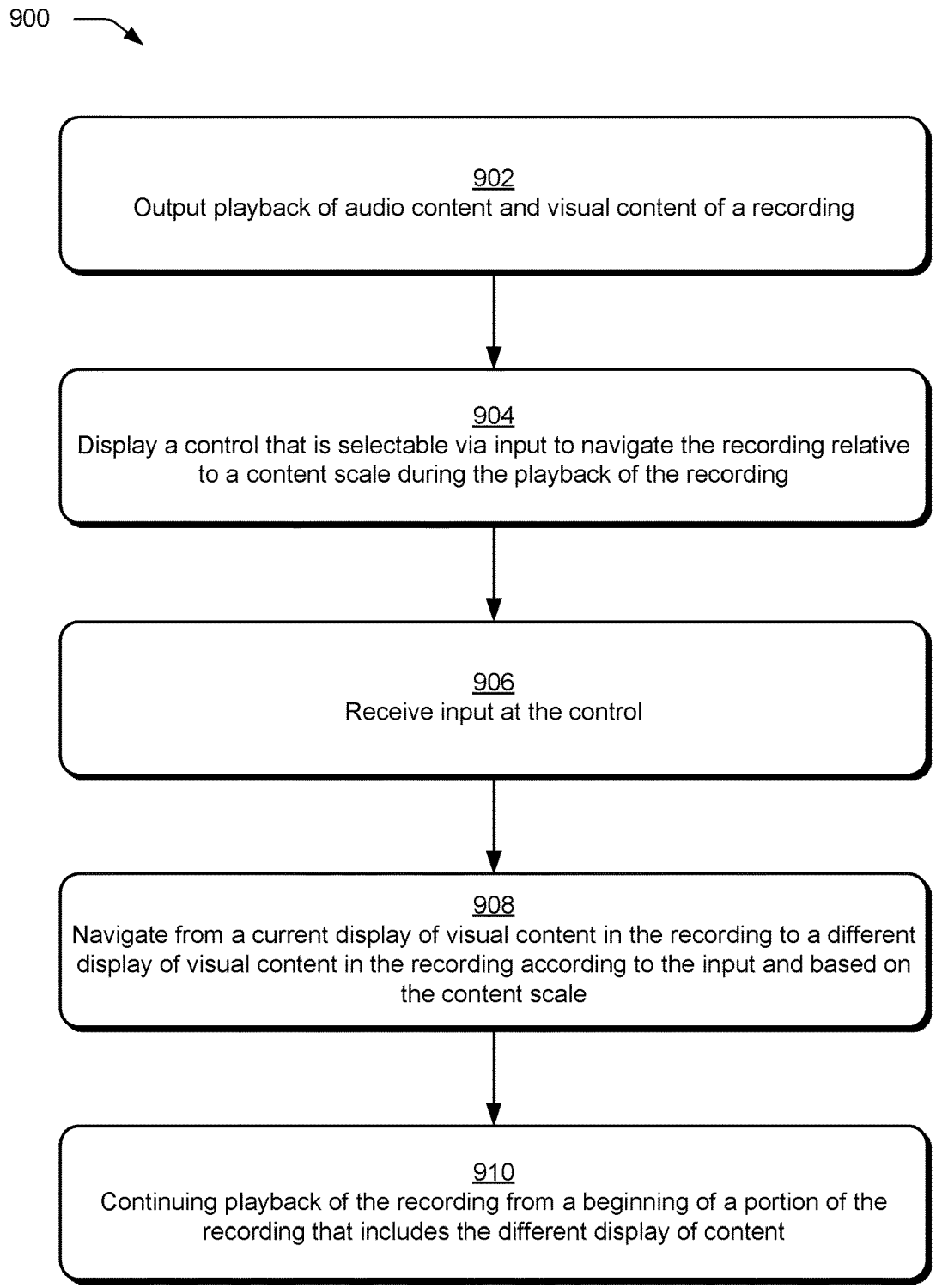
FIG. 9 is a flow diagram depicting a procedure in an example implementation for navigating a content-navigable recording using the techniques described herein.

FIG. 9 depicts a procedure 900 in an example implementation of outputting playback of a content-navigable recording using the techniques described herein. Playback of audio content and visual content of a recording is output (block 902). The content playback system 120, for instance, outputs visual content 110 and audio content 112 of the content-navigable recording 106 using at least one output device of computing device 102, as described in further detail below with respect to FIG. 11.

A control that is selectable via input to navigate the recording relative to a content scale during playback of the recording is displayed (block 904). The content playback system 120, for instance, outputs display of the content navigation control 208. In some implementations, the content navigation control 208 is configured as a vertical scroll bar, such as the content navigation control 704 as illustrated in FIG. 7. Alternatively, the content navigation control 208 may be configured in one of a variety of different configurations, such as a horizontal scroll bar, as a scrolling wheel, as a set of selectable buttons, combinations thereof, and so forth. In some implementations, the content navigation control 208 may be output in a manner that is not visible to the human eye, such as a defined region of the user interface without visible borders.

Input is received at the control (block 906). For example, input may be received that alters a location of a current-position indicator relative to the content navigation control, such as input moving the current position indicator 706 relative to the content navigation control 704, as illustrated in FIG. 7. The input may be received in a variety of manners, such as via one of the input/output interfaces described in further detail below with respect to FIG. 7.

Responsive to receiving the input, the recording is navigated from a current display of visual content to a different display of visual content, based on the content scale for the recording (block 908). The content playback system 120, for instance, determines that the current-position indicator 706 of the content navigation control 704 has been moved to a position 710, as illustrated in FIG. 7. The content playback system 120 then determines a relative change in position of the current-position indicator relative to a length of the content navigation control 704 and leverages information included in the content scale 204 to determine a corresponding point during playback of the content-navigable recording 106 that corresponds to the changed position of the current-position indicator.

Playback of the recording from a beginning of a portion of a recording that includes the different display of content is then output (block 910). The content playback system 120, for instance, identifies the point in the content-navigable recording 106 illustrated in user interface 708 of FIG. 7, which corresponds to the current-position indicator of the content navigation control 704 being moved to position 710. In response to identifying the point in the content-navigable recording 106 corresponding to the altered position of the current-position indicator relative to the content navigation control 704, both visual content 110 and audio content 112 of the content-navigable recording corresponding to position 710 on the content navigation control 704 are output for playback.

Figure 10:
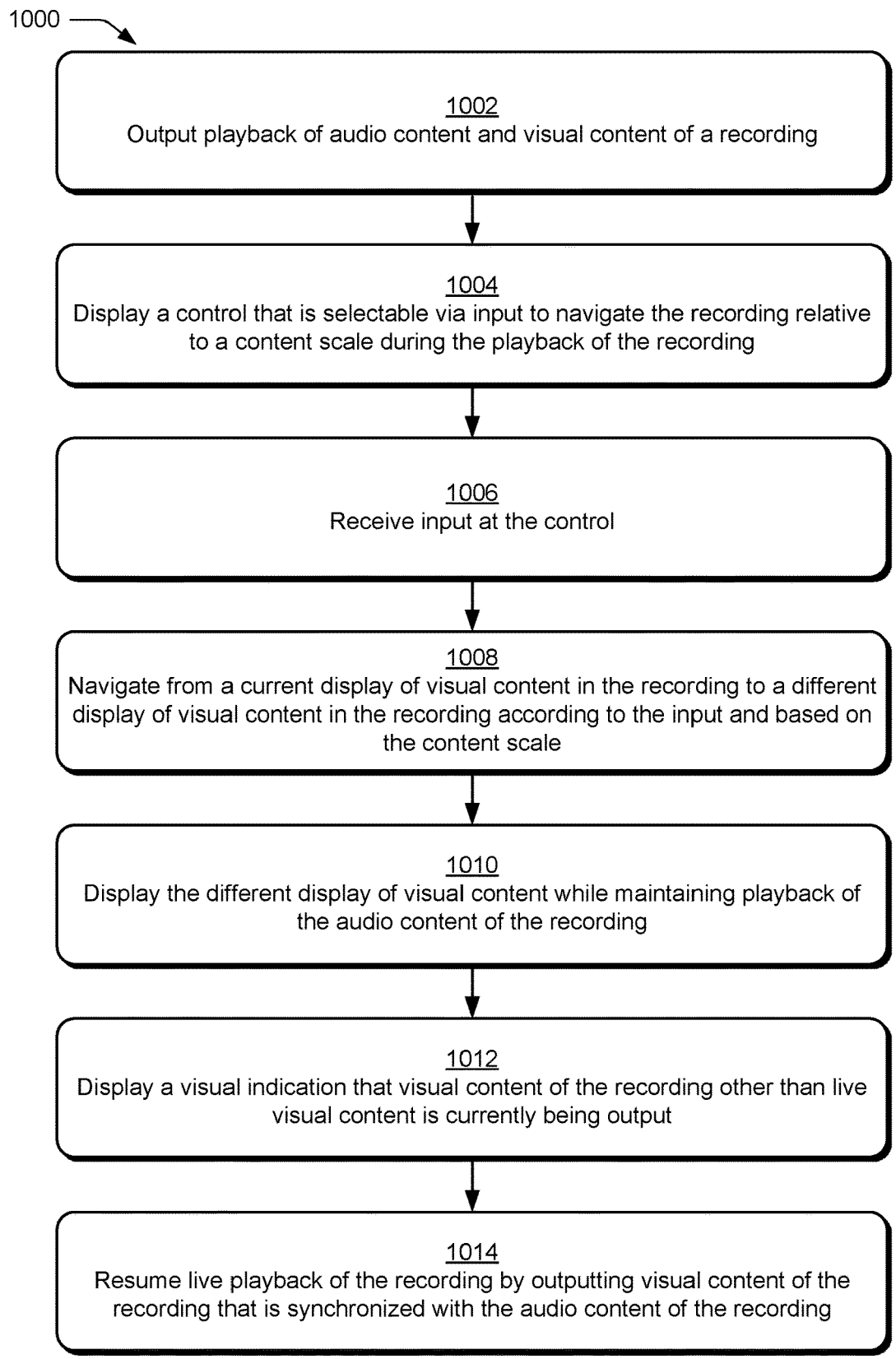
FIG. 10 is a flow diagram depicting a procedure in an example implementation for navigating a content-navigable recording using the techniques described herein.

FIG. 10 depicts a procedure 1000 in an example implementation of outputting playback of a content-navigable recording using the techniques described herein. Playback of audio content and visual content of a recording is output (block 1002). The content playback system 120, for instance, outputs visual content 110 and audio content 112 of the content-navigable recording 106 using at least one output device of computing device 102, as described in further detail below with respect to FIG. 11.

A control that is selectable via input to navigate the recording relative to a content scale during playback of the recording is displayed (block 1004). The content playback system 120, for instance, outputs display of the content navigation control 208. In some implementations, the content navigation control 208 is configured as a vertical scroll bar, such as the content navigation control 704 as illustrated in FIG. 7. Alternatively, the content navigation control 208 may be configured in one of a variety of different configurations, such as a horizontal scroll bar, as a scrolling wheel, as a set of selectable buttons, combinations thereof, and so forth. In some implementations, the content navigation control 208 may be output in a manner that is not visible to the human eye, such as being output as a defined region of the user interface without visible borders.

Input is received at the control (block 1006). For example, input may be received that alters a location of a current-position indicator relative to the content navigation control, such as input moving the current position indicator 706 relative to the content navigation control 704, as illustrated in FIG. 7. The input may be received in a variety of manners, such as via one of the input/output interfaces described in further detail below with respect to FIG. 7.

Responsive to receiving the input, the recording is navigated from a current display of visual content to a different display of visual content, based on the content scale for the recording (block 1008). The content playback system 120, for instance, determines that the current-position indicator 706 of the content navigation control 704 has been moved to a position 710, as illustrated in FIG. 7. The content playback system 120 then determines a relative change in position of the current-position indicator relative to a length of the content navigation control 704 and leverages information included in the content scale 204 to determine a corresponding point during playback of the content-navigable recording 106 that corresponds to the changed position of the current-position indicator.

The different display of visual content is displayed while maintaining playback of the audio content of the recording (block 1010). The content playback system 120, for instance, identifies the point in the content-navigable recording 106 illustrated in user interface 708 of FIG. 7, which corresponds to the current-position indicator of the content navigation control 704 being moved to position 710. Visual content 110 corresponding to the position 710 is displayed, while playback of audio content 112 continues uninterrupted from prior to receiving the input moving the current-position indicator of the content navigable control 704, or other input as specified by block 1006.

Responsive to displaying the different display of visual content, a visual indication is displayed indicating that visual content of the recording other than live visual content is currently being output (block 1012). The content playback system 120, for instance, displays the visual indicator 712, indicating that the current view of visual content 110 is not synchronized with the current output of audio content 112. The visual indicator 712 may be configured to be selectable via input to return to a display of visual content 110 that is synchronized with the uninterrupted output of audio content 112.

Live playback of the recording is then resumed by outputting visual content of the recording that is synchronized with the audio content of the recording (block 1014). For instance, in response to receiving input at the visual indicator 712, the content playback system 120 may identify visual content 110 in a time block corresponding to the current playback position of audio content 112 and display the visual content 110 synchronously with the uninterrupted output of audio content 112. Thus, the techniques described herein facilitate navigation among changes in visual content of a video recording in a manner that is time-independent and that may be performed without interrupting playback of audio content of the video recording, while presenting an option to quickly resume synchronous playback of both audio and visual content of the video recording.

Having described example procedures in accordance with one or more implementations, consider now an example system and device that can be utilized to implement the various techniques described herein.

Example System and Device

Figure 11:
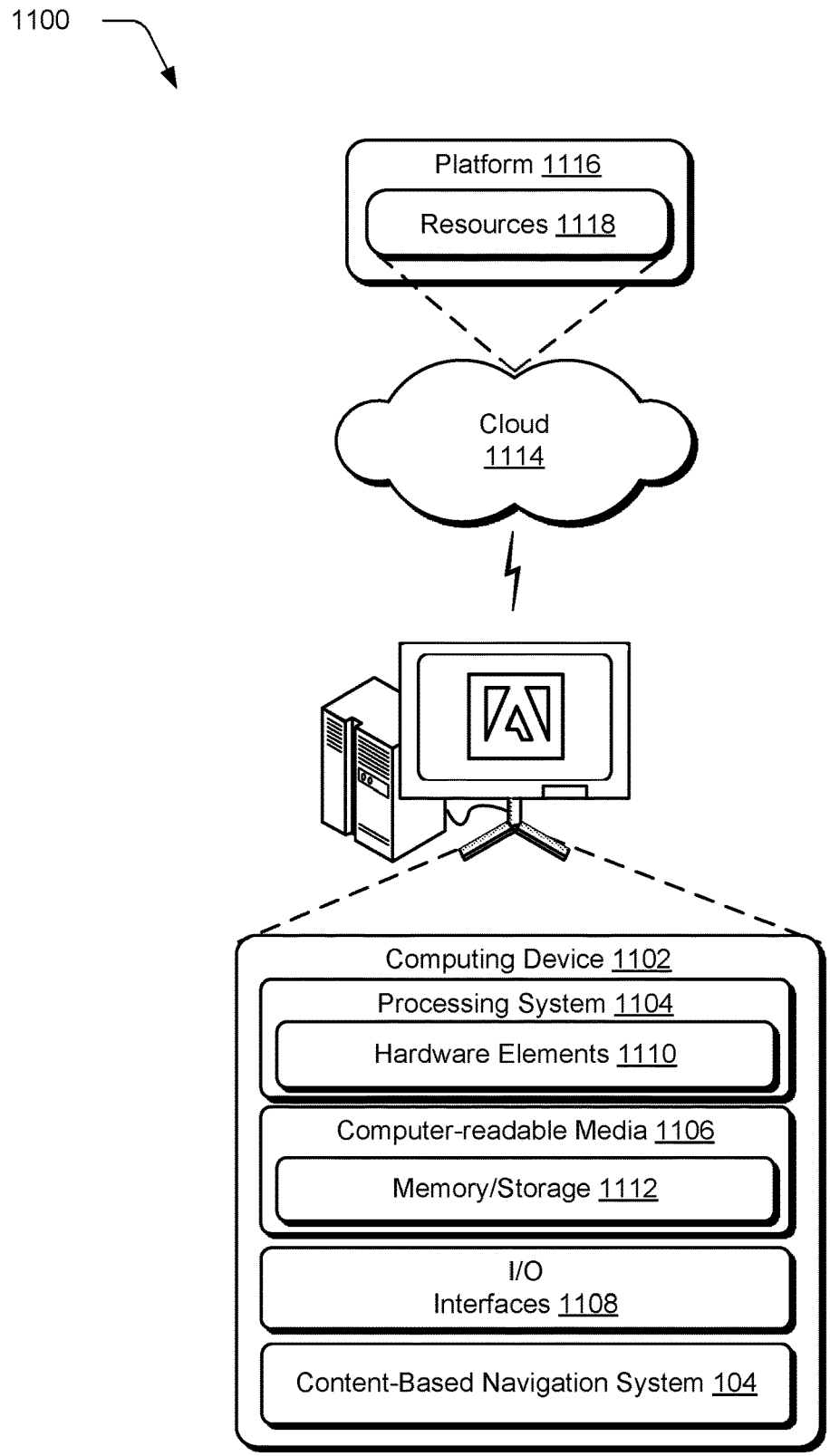
FIG. 11 illustrates an example system including various components of an example device that can be implemented as a computing device as described and/or utilized with reference to FIGS. 1-10 to implement the techniques described herein.

FIG. 11 illustrates an example system generally at 1100 that includes an example computing device 1102 that is representative of one or more computing systems and/or devices that may implement the various techniques described herein. This is illustrated through inclusion of the content-based navigation system 104. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a version of a recording that is navigable based on changes in visual content of the recording, a method implemented by at least one computing device, the method comprising:
   receiving, at the at least one computing device, a recording that includes a presentation of visual content and a presenter of the visual content;
   determining, by the at least one computing device, a content scale for navigating the recording based on a number of changes to a view of the presentation of the visual content during playback of the recording, each of the changes to the view of the presentation of the visual content comprising an updated display of visual content for a current frame of the recording relative to a previous frame of the recording;
   generating, by the at least one computing device, a content navigation control for navigating the recording based on the content scale, the content navigation control being configured to enable navigation among different ones of the changes to the view of the presentation of the visual content of the recording responsive to receiving input at the content navigation control; and
   outputting, by the at least one computing device, a content-navigable version of the recording that includes the content navigation control.

2. The method as described in claim 1, wherein the recording is a video that includes the presentation of the visual content in a display area separate from a display area that includes the presenter of the visual content.

3. The method as described in claim 1, further comprising embedding, by the at least one computing device, information describing the content scale and the content navigation control in metadata of the content-navigable version of the recording.

4. The method as described in claim 1, further comprising determining, by the at least one computing device, the number of changes to the presentation of the visual content of the recording during playback of the recording by applying a sliding window algorithm to the presentation of the visual content portion of the recording.

5. The method as described in claim 1, wherein the content scale includes information describing a beginning time stamp relative to a playback duration of the recording for each of the changes to the view of the presentation of the visual content.

6. The method as described in claim 1, wherein a navigation granularity of the content navigation control is dependent on the number of changes to view of the presentation of the visual content.

7. The method as described in claim 1, wherein a navigation granularity of the content navigation control is independent of time between the changes to the view of the presentation of the visual content.

8. The method as described in claim 1, further comprising:
   determining, by the at least one computing device, a time scale for navigating the recording;
   generating, by the at least one computing device, a time navigation control for the recording using the time scale; and
   outputting, by the at least one computing device, a content-navigable version of the recording that includes the time navigation control and the content navigation control, wherein the time navigation control is configured as a horizontal scroll bar and the content navigation control is configured as a vertical scroll bar.

9. The method as described in claim 8, further comprising simultaneously displaying, by the at least one computing device, the time navigation control and the content navigation control during playback of the content-navigable version of the recording.

10. A system comprising:
    a content playback module implemented at least partially in hardware of at least one computing device and configured to output playback of a recording at a computing device, the recording including a control that is selectable via input to navigate the recording relative to a number of changes to a view of visual content of the recording during playback of the recording, each of the changes to the view of the visual content comprising an updated display of the visual content for a current frame of the recording relative to a previous frame of the recording;
    a navigation module implemented at least partially in hardware of the at least one computing device and configured to receive input at the control and navigate to a different display of visual content of the recording based on the input; and
    the content playback module further configured to continue playback of the recording from a portion of the recording that includes the different display of the visual content.

11. The system as described in claim 10, wherein the recording includes audio content synchronized with the visual content.

12. The system as described in claim 11, the content playback module further configured to synchronize playback of audio content that corresponds to the different display of the visual content upon continuing playback of the recording from the portion of the recording that includes the different display of the visual content.

13. The system as described in claim 10, the navigation module further configured to navigate to the different display of the visual content of the recording according to a granularity that is dependent on the number of changes to the view of visual content of the recording.

14. The system as described in claim 10, wherein the navigation module is configured to navigate to the different display of the visual content of the recording according to a granularity that is independent of a playback time associated with each of the number of changes to the view of the visual content of the recording.

15. In a digital medium environment to navigate a recording in a time-independent manner based on changes in visual content of the recording, a method implemented by at least one computing device, the method comprising:

outputting, by at least one computing device, synchronized playback of audio content and visual content of the recording, the recording including a content scale stored in metadata of the recording, the content scale describing a number of changes to a view of visual content during playback of the recording, and the metadata configured to facilitate output of a content navigation control that is selectable via input to navigate the recording relative to the number of changes to the view of visual content of the recording;

receiving, by the at least one computing device, input at the content navigation control and navigating from a current display of visual content in the recording to a different display of the visual content in the recording according to the input while maintaining playback of the audio content of the recording;

displaying, by the at least one computing device, a visual indication that the different display of the visual content is not synchronized with the audio content of the recording; and resuming, by the at least one computing device, synchronized playback of the visual content and the audio content of the recording responsive to receiving input at the visual indication.

16. The method as described in claim 15, the recording further including a time navigation control that is selectable via input to navigate the recording relative to a playback duration of the recording.

17. The method as described in claim 16, wherein the content navigation control is a vertical scroll bar and the time navigation control is a horizontal scroll bar.

18. The method as described in claim 15, wherein the recording is a video.

19. The method as described in claim 15, wherein a navigation granularity of the content navigation control depends on the number of changes to the view of visual content of the recording and is independent of time between respective ones of the number of changes to the view of the visual content of the recording.

20. The method as described in claim 15, wherein the content scale specifying the number of changes to the view of visual content of the recording during playback of the recording is determined from applying a sliding window algorithm to the recording.

* * * * *